Patented May 14, 1929.

1,713,250

UNITED STATES PATENT OFFICE.

HENRY BLUMENBERG, JR., OF LOS ANGELES, CALIFORNIA.

FILTERING MATERIAL.

No Drawing.   Application filed August 10, 1927. Serial No. 212,129.

My invention relates to a composition of matter intended for use as a filtering material.

It is an object of this invention to provide a filtering material which has superior purifying, bleaching and germicidal properties. It is adapted for the purification, clarification and deodorizing of mineral oil distillates such as gasoline, kerosene and lubricating oils, but may also be used for the purification of water and industrial waste liquors and sewerage.

My invention consists of the composition of matter hereinafter described and claimed.

I take aluminum sulphate

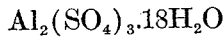

which, as shown by the formula, is associated with eighteen molecules of water of crystallization. It may be used with all the water of crystallization but I prefer to dehydrate the same at least in part, which is done by heating the same up to 120° C. The last few molecules of water of crystallization are difficult to expel but for the present purpose it is immaterial whether it contains some or all of the water of crystallization. The aluminum sulphate is now mixed with calcium hypochlorite $Ca(OCl)_2$. Both ingredients are ground to a fineness of 20–100 screen mesh.

Disregarding the water of crystallization that may be associated with the aluminum sulphate, the proportions of aluminum sulphate and calcium hypochlorite are taken as 1 to 3, expressed in their molecular weights, so that approximately four (4) parts of aluminum sulphate are mixed with five (5) parts of calcium hypochlorite. To 100 pounds of this mixture I prefer to add from 10 to 30 pounds of inert cellular material, preferably ground a fineness of about 20 screen mesh. Material suitable for this purpose is pumice, diatomaceous earth, charcoal, wood fibre, asbestos and the like. The cellular material and the mixture of aluminum sulphate and calcium hypochlorite are agitated to form a homogenous mass.

The aluminum sulphate and calcium hypochlorite will not react in the dry state but only in the presence of water or when in contact with organic matter, forming calcium sulphate $CaSO_4$, aluminum chloride $Al_2Cl_6$, and chlorine dioxide $CdO_2$. It is the chlorine dioxide which is the powerful oxidizing agent clarifying and deodorizing the liquids to be treated as well as destroying bacteria and germs.

One-half to five percent by weight of the filtering material thus prepared is usually sufficient for the clarification and deodorization of mineral oil distillates. For the purification of water 25 pounds of the filtering material to one million gallons of water is sufficient. The aluminum chloride in the presence of water will decompose into aluminum hydroxide, which greatly assists the filtering operation. It may be noted here that the chlorine dioxide in contra-distinction to the chlorine, which is sometimes used for water purification, leaves no disagreeable odor. The slight odor present resembles that of ozone.

In the treatment of industrial waste liquors and of sewerage from 100 to 500 pounds of the filtering material are usually required per one million gallons.

The liquids to be treated are either passed through a layer of the filtering material under pressure, or allowed to percolate by gravity.

It will be understood that various changes may be made in my invention by those skilled in the art without departing from the spirit of my invention as claimed.

I claim:

1. A filtering material for use as a purifying, deodorizing and oxidizing agent containing aluminum sulphate, calcium hypochlorite, and an inert cellular material.

2. A filtering material for use as a purifying, deodorizing and oxidizing agent containing aluminum sulphate, calcium hypochlorite and diatomaceous earth.

3. A filtering material for use as a purifying, deodorizing and oxiding agent containing aluminum sulphate, calcium hypochlorite, the proportions by weight being one molecule of aluminum sulphate to three molecules of calcium hypochlorite, and an inert cellular material.

4. A filtering material for use as a purifying, deodorizing and oxidizing agent containing the following ingredients in approximately the proportions stated:

Aluminum sulphate _____ 36 lbs.
Calcium hypochlorite _____ 55 lbs.
Diatomaceous earth _____ 10 to 30 lbs.

In testimony whereof I have signed my name to this specification.

HENRY BLUMENBERG, JR.